United States Patent [19]
Hobel

[11] 3,817,106
[45] June 18, 1974

[54] ELECTRICAL MEASURING DEVICE
[75] Inventor: Peter Hobel, Erlangen, Germany
[73] Assignee: Siemens Aktiengesellschaft, Munich, Germany
[22] Filed: Apr. 20, 1972
[21] Appl. No.: 246,087

Related U.S. Application Data
[63] Continuation of Ser. No. 79,524, Oct. 9, 1970, abandoned.

[30] Foreign Application Priority Data
Nov. 4, 1969 Germany.......................... 1958906

[52] U.S. Cl......................... 73/391, 73/4 R, 346/62
[51] Int. Cl. ......................................... G01l 19/08
[58] Field of Search.......... 73/391, 1 R, 432 A, 4 R; 346/62, 23, 65; 128/2.06 G, 2.05 Q, 2.05 R

[56] References Cited
UNITED STATES PATENTS
2,661,260 1/1953 Salzman.............................. 346/65

*Primary Examiner*—Donald O. Woodiel
*Attorney, Agent, or Firm*—Richards & Geier

[57] ABSTRACT

An electrical measuring device, specifically an electrical manometer for direct blood pressure measurements is provided with a writing device for inscribing the effective signal and a device connected in advance of the writing device for changing the measuring range. The measuring device also includes a calibrating impulse generator as well as switching means, such as a calibration key, for interrupting the feed of the effective signal and for blending the calibrating impulses produced by the calibrating impulse generator as calibrating markings in the inscription of the effective signal. The invention is particularly characterized by the provision of marking generators operated by the range changing device and producing range markings corresponding to the individual measuring ranges. The invention is also characterized by the feature that the range markings are blended with calibration unit markings which are independent from the set measuring range.

13 Claims, 7 Drawing Figures

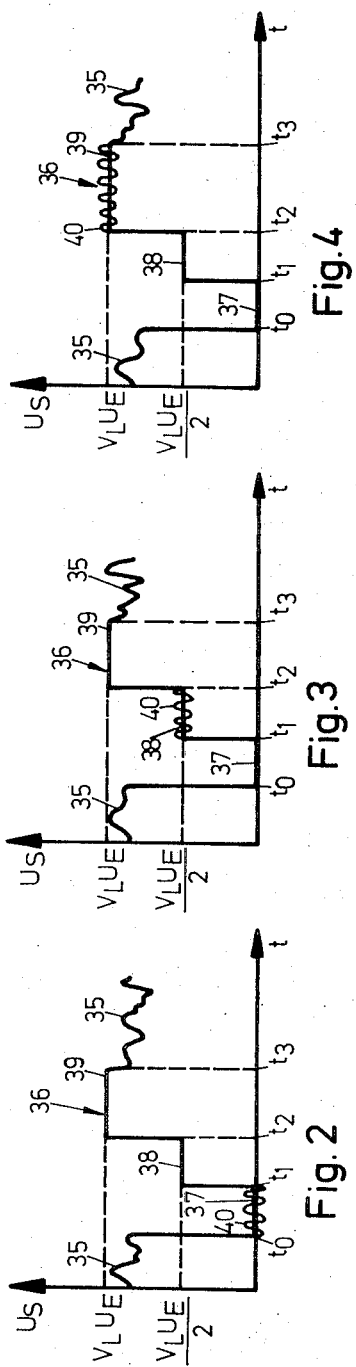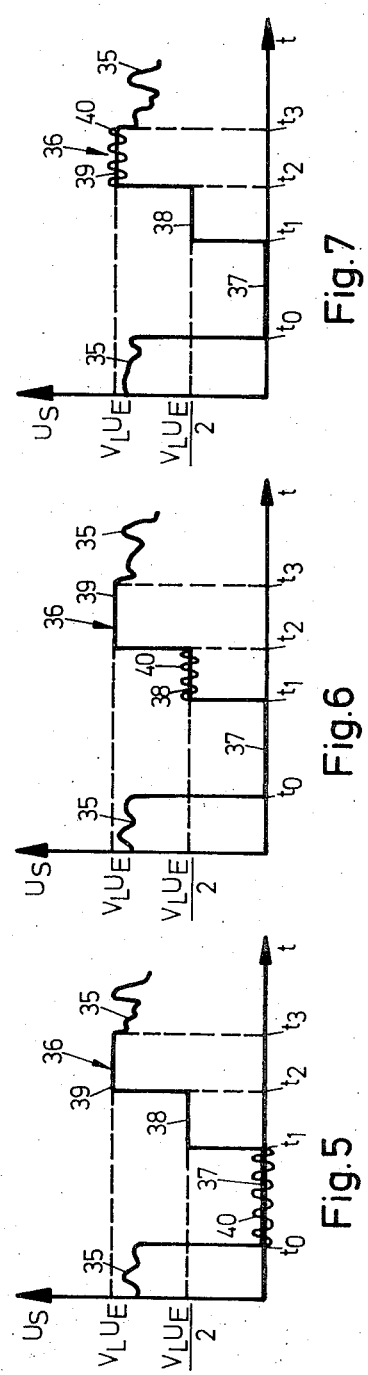

ELECTRICAL MEASURING DEVICE

This is a continuation of application Ser. No. 79,524, filed Oct. 9, 1970, now abandoned.

DESCRIPTION OF THE INVENTION

This invention relates to an electrical measuring device, specifically an electrical manometer for direct blood pressure measurements, which comprises a writing device for inscribing the effective signal, a device connected ahead of the writing device for changing the measuring range, a calibrating impulse generator and switching means, such as a calibration key, for interrupting the feed of the effective signal and for blending the calibrating impulses produced by the calibrating impulse generator as calibrating markings in the inscription of the effective signal.

Measuring devices of this type are used, for example, in direct (bloody) blood pressure measurements for receiving and inscribing the time course of blood pressure (pressure curve). In known electric manometers the effective signal produced by the pressure receiver is amplified in a measuring amplifier (a preliminary amplifier with a rearwardly switched final amplifier) and thereupon is supplied for inscription to the writing device. The preliminary amplifier is provided with a change-over switch which can be used to switch on the desired measuring range. The usual measuring ranges are, for example, the tens ranges 10, 20, 40 Torr and the hundreds ranges 100, 200, 400 Torr. The blending of the calibrating markings in the inscription of the effective signal is then carried out by interrupting the connection between the receiver and the preliminary amplifier by the calibration key and by feeding to the preliminary amplifier for short time periods, instead of the effective signal, calibrated direct voltage supplied by a direct voltage generator. The calibrated impulses which are thus produced are more or less strengthened depending upon the measuring range set at the preliminary amplifier and are fed to the writing device for inscription as calibrated markings.

A drawback of these known manometers consists in that the calibrated impulses fed from the preliminary amplifier to the writing device are increasingly damped when going over to higher measuring ranges corresponding to the set measuring range. This means that, particularly in case of high pressures, the calibrating marks blended into the pressure curves due to their lower value make difficult a quick and precise evaluation of the inscribed pressure curves.

By way of example, the amount of a 10 Torr calibrating impulse at the outlet of the preliminary amplifier and when a measuring range of 40 Torr is switched on, is only a quarter of the amount which it would have when a 10 Torr measuring range is switched on. If a 400 Torr measuring range is switched on, the amount will be only one-fortieth.

This drawback can be eliminated, however, by also increasing the amount of the calibrating impulses supplied to the preliminary amplifier when going over to higher measuring ranges corresponding to the set measuring range, for example, 10 Torr calibrating impulses for a 10 Torr measuring range, 100 Torr calibrating impulses for a 100 Torr measuring range, etc. However, this produces new drawbacks which make such a process completely useless for practical purposes.

One drawback results from the necessity of having to produce a number of calibrating impulses of different values corresponding to the number of measuring ranges. A substantial expense and use of complicated switch technology are necessary to produce such calibrating impulses.

A further and more important drawback consists in that the calibrating markings blended into the inscription of the effective signal are substantially the same and equal for all measuring ranges, so that when the pressure curves are evaluated, it is not possible subsequently to recognize clearly in which ranges the measurements were taken. This drawback, particularly in case of lengthy measurements and a rapid change of patients, may cause errors during evaluation of pressure curves and lead to a wrong diagnosis with its harmful consequences.

An object of the present invention is to eliminate the drawbacks of prior art devices and to provide an electromanometer of the described type which will make possible without great expenditure a quicker, more precise and a well defined evaluation of inscribed pressure curves.

Other objects of the present invention will become apparent in the course of the following specificaiton.

In the accomplishment of the objectives of the present invention it was found desirable to provide marking generators operated by the device changing the measuring range so as to produce range markings corresponding to the individual measuring ranges and to blend the range markings with calibration unit markings which are independent from the set measuring range.

The advantages of the device of the present invention consist, on the one hand, in that it is now possible to always write calibrating markings of constant value above the zero line independently of the switched in measuring range, so that for all practical purposes no extrapolations for evaluation of pressure curves are necessary any more, such as were required in the original manometers due to the too low calibration markings in the higher pressure ranges; this makes possible a quicker and more precise evaluation of the pressure curves. On the other hand, errors in evaluation due to confusion of measuring ranges are effectively made impossible due to the fixed association of the calibrating marking and range indication.

The simplest way of producing calibrating markings independent from the set measuring range, consists in supplying the calibrating impulses of a single calibrating impulse generator directly to the writing device via switching means provided in the connection between the measuring range changing device and the writing device.

It is then advantageous to so select the amplitude of the calibrating impulses that they correspond to the voltage value at the outlet of the measuring range changing device at full utilization of the measuring ranges; this makes it possible to evaluate easily and precisely the inscriptions of even such effective signals the maximum values of which are close to the maximum permissible range voltages.

In order to make easier the evaluation of minimum values it is advantageous to use calibration impulses which are stepped upon at least one flank, for example, upon the front flank (once or several times). It is advantageous to make all steps of the same height.

To produce range indications a separate indicating generator can be used for each measuring range, which will produce a special indicating marking corresponding to that measuring range. However, when several measuring ranges are used, it is advantageous to combine them into measuring range groups of preferably equal strength and to supply a group indicating generator for each measuring range group which will produce a group indication. Further indicating generators are provided, the number of which corresponds to the number of measuring ranges per group; their indications in combination with the group indication provide the indication of the measuring range. This makes it possible to reduce the total number of the required indicating generators.

It is advantageous to provide means producing a time-delayed blending of the calibrating markings after the interruption of the effective signal, as well as further means for changing the time delay. These variable time delays cause the inscription of a more or less long zero line in the writing device between the interruption of the effective signal and the blending of the calibrating marking. This zero line can be used for group indication or for indication of measuring ranges within the groups.

Delaying members can be used, for example, as means producing variable time delays, which either feed with time delay already produced calibrating impulses to the writing device or actually delay the production of calibrating impulses.

An advantageous further construction can be provided for measuring devices wherein stepped calibrating impulses are used and the measuring ranges are combined into groups and wherein for group evaluation the time delay between effective signal interruption and the calibrating marking blending is varied or actually the length of the calibrating impulses itself is varied. This advantageous further construction consists in the provision of a single indicating generator for indicating measuring ranges within a group, the generator supplying an indicating marking which is similar for all measuring ranges depending upon the position of the measuring range switching device and being operated by the calibrating impulse generator between the interruption of the effective signal and the calibrating marking blending or between two step discontinuities of the calibrating impulse which follow each other.

The indicating marking can be supplied by switching on and off the indicating generator depending upon the outgoing voltage of the calibrating impulse generator. Another possibility consists in that the indicating generator is always switched on and that the supply of the indicating marking takes place via a plurality of gate switching means connected in parallel and provided between the indicating generator and the writing device, whereby these switching means are opened individually depending upon the location of the measuring range changing device and being operated by the calibrating impulse generator.

The simplest solution consists in that the indicating generator is continuously switched on and that the supply of the indicating marking takes place through a single electronic gate switch provided between the indicating generator and the writing device, the switch being opened by a switching signal produced in a matrix and dependent upon the location of the measuring range switching device and upon the outlet voltage of the calibrating impulse generator.

By way of example, a sinus generator can be used as the indicating generator, which produces a sinus voltage of small amplitude (Brumm).

The invention will appear more clearly from the following detailed description when taken in connection with the accompanying drawings showing by way of example only, a preferred embodiment of the inventive idea.

In the drawings:

FIGS. 2 to 7 show parts of different inscriptions made by a line writer and representing the time continuities of pressure curves in six different measuring ranges, namely 10, 20, 40, 100, 200 and 400 Torr, along with calibrating markings blended into the pressure curves as well as range indications corresponding to the measuring ranges.

Figure 1:
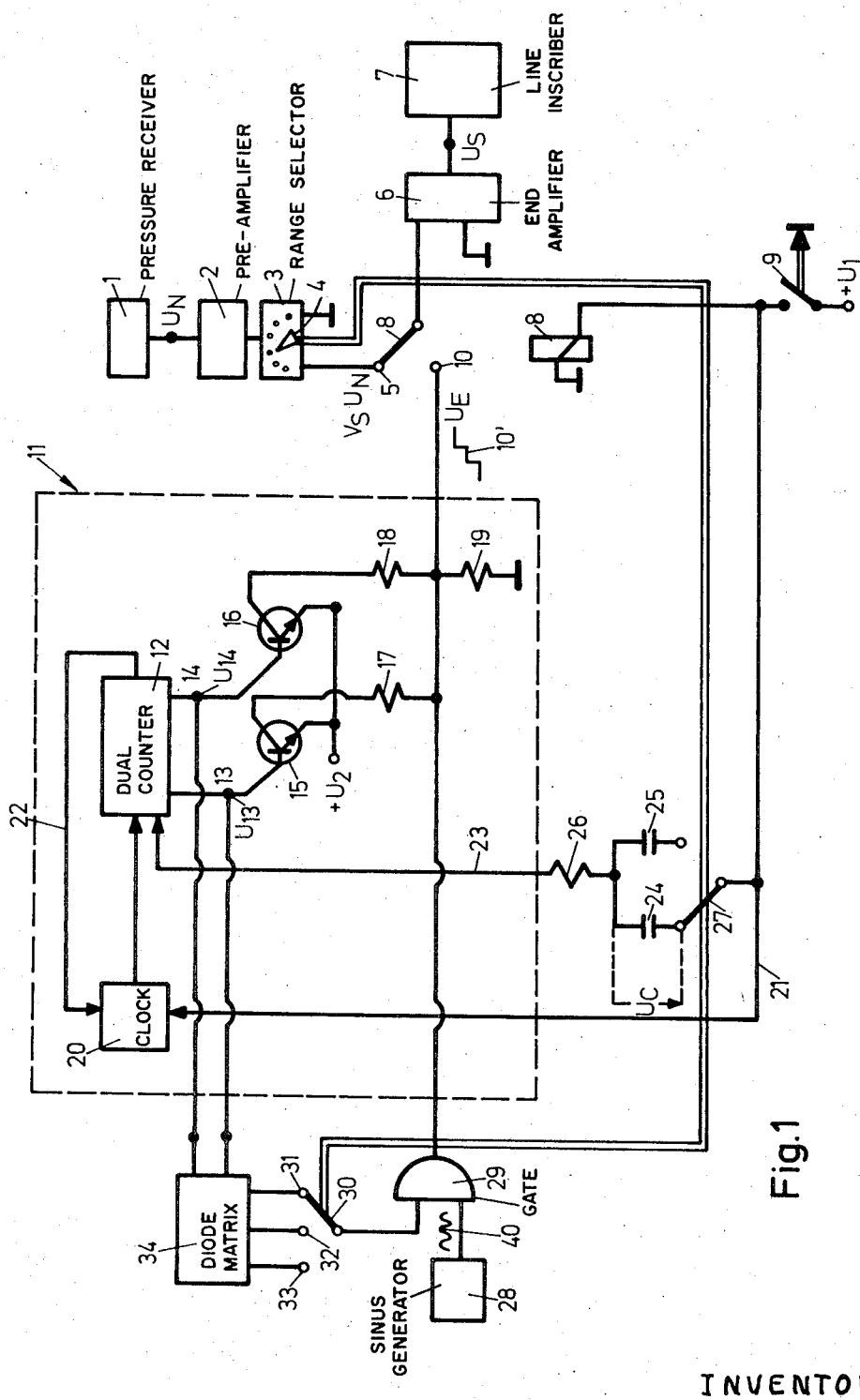
FIG. 1 is a circuit diagram of the device constituting the present invention.

FIG. 1 shows a pressure receiver 1 which produces an effective signal $U_N$ supplied to a voltage amplifier 2 (pre-amplifier), which is provided with a device 3 for changing the measuring range. The device 3 has a measuring range switch 4 which makes it possible to set a total of six different measuring ranges, namely 10, 20, 40, 100, 200 and 400 Torr.

At the outlet 5 of the device 3 appears an amplified effective signal $V_S U_N$, wherein $V_S$ is the amplifying factor of the amplifier. This signal is again amplified by an output amplifier 6 (end amplifier) by the factor $V_L$ which is the amplifying factor of the end amplifier, and is transmitted to a line inscriber 7 for signal inscription.

The incoming signal of the line inscriber 7 is generally indicated as $U_S$.

A relay 8 is located between the device 3 and the end amplifier 6. When the relay is not excited, it provides a connection between the device 3 and the end amplifier 6. The relay 8 can be actuated by pressing a calibrating key 9. When the relay is excited this connection is interrupted and instead the relay connects the end amplifier 6 with the outlet 10 of a calibrating impulse generator 11 which produces calibrating impulses 10' which are twice stepped in their raising flanks. The steps of the impulses 10' are of the same height. The maximum amplitude of the impulses 10' is indicated as $U_E$.

The generator 11 includes a two-step dual counter 12 (series connection out of two flip-flop steps) having an outlet 13 connected with the base of a transistor 15 and having another outlet 14 connected with the base of a transistor 16.

The collectors of the transistors 15 and 16 are connected by ohmic resistances 17, 18 and a common resistance 18 to the mass while their emitters are supplied with a positive direct voltage $U_2$. The resistance 17 is double the size of the resistance 18 while the resistance 19 is small compared to the resistances 17 and 18.

The dual counter 12 is operated by a tact impulse emitter 20 (astable multivibrator) which is started by positive starting impulses (supply of direct voltage $U_1$ for short time periods) produced by depressing the calibrating key 9 and fed by the connecting line 21. It can be stopped by a locking impulse released during the initial kipping of the second flip-flop step of the dual counter 12 and back coupled via the connecting line 22. The positive starting impulse produced by the key 9 is also supplied to the operating portion of the double counter 12 through the connecting line 23. The feeding of the starting impulse then takes place depending upon the position of the change-over switch 27 via one of the two condensers 24 or 25 as well as an ohmic resistance 26 connected in series with the condensers 24, 25. The capacities of the condensers 24 and 25 are different ($C_{24} < C_{25}$). Their task is as follows: When the key 9 is depressed the operating portion of the dual counter 12 is connected for a short time period to the mass potential, so that the dual counter 12 is placed into its zero position. At the same time the dual counter 12 is closed to the tact impulses produced by the tact impulse generator 20 until the voltage $U_c$ has attained its full positive value. The duration of this closed condition can be varied by providing different measurements to the condensers 24, 25.

The change-over switch 27 is actuated directly by the switch 4 in such manner that for the measuring ranges 10, 20, 40 Torr the condenser 24 is always switched on, while the condenser 25 is always switched on for the measuring ranges 100, 200, 400 Torr.

A sinus generator 28 produces sinus oscillations 40 which are always supplied via an electronic gate switch 29 tp the outlet 10 of the generator 11 when the gate switch 29 is open. The gate switch 29 is operated depending upon the position of the change-over switch 30 and the voltages $U_{13}$, $U_{14}$ appearing at the outlets 13 and 14 of the dual counter 12. The change-over switch 30 is operated directly by the measuring range switch 4 in such manner that when the 10 Torr or 100 Torr measuring range is set, the gate switch 29 is always connected with the outlet 31 (switch position 1). When the 20 Torr or 200 Torr measuring range is set, the gate switch 29 is always connected with the outlet 32 (switch position 2). When the 40 Torr or 400 Torr measuring range is set, the gate switch 29 is always connected with the outlet 33 (switch position 3). The outlets are those of a diode matrix 34.

The gate switch is always opened when the following conditions are met:

1. The change-over switch 30 is located in the switch position 1. The gate switch 29 is open only while the voltages $U_{13}$ and $U_{14}$ are zero (the transistors 15 and 16 are locked).

2. The change-over switch 30 is located in the switch position 2. The gate switch 29 is open only while the voltage $U_{14}$ is zero and while the voltage $U_{13}$ has a positive value $U_{13} > U_2$ (transistor 15 is conducting, transistor 16 is locked).

3. The change-over switch 30 is located in the switch position 3. The gate switch 29 is open only while the voltage $U_{13}$ is zero and while the voltage $U_{14}$ has a positive value $U_{14} > U_2$ (transistor 15 is locked, transistor 16 is conducting).

FIGS. 2 to 7 are diagrams representing the incoming signal $U_5$ (writing voltage) of the line writer 7 as a function of the time t. The inscribed effective signal $V_S V_L U_N$ (pressure curve) is indicated by the numeral 35, the inscribed calibrating impulse (calibrating marking) which has been strengthened by the factor $V_L$, is indicated as 36. The time $t_o$ always indicates the time when the feed of the effective signal was interrupted. During the time period $t_1 - t_o$ the zero line 37 was written, while during the time period $t_2 - t_1$ the first step 38 of the calibrating marking 36 and during the time period $t_3 - t_2$ the second step 39 of the calibrating marking 36 were written. At the time $t_3$ the supply of the effective signal is again resumed.

The six measuring ranges which are being used, are subdivided into two range groups, namely, a tens group with the ranges 10 Torr (FIG. 2), 20 Torr (FIG. 3) and 40 Torr (FIG. 4) and a hundreds group with 100 Torr (FIG. 5), 200 Torr (FIG. 6) and 400 Torr (FIG. 7). To indicate the groups the zero line 37 of the hundreds group has been made twice as long as the zero line 37 of the tens group.

To indicate the individual measuring ranges within one group the sinus oscillation 40 produced by the sinus generator 28 is blended as an indicating mark at different time periods.

The circuit of FIG. 1 is operated as follows:

The desired measuring range is set in the measuring range changing device 3 by means of a measuring range switch 4. At the same time the change-over switches 27, 30 are moved into switching positions corresponding to the selected range. By way of example, FIG. 1 shows positions of switches corresponding to the selected 10 Torr measuring range. The relay 8 is not excited, so that the device 3 is connected with the end amplifier 6. At the time $t_o$ the calibrating key 9 is actuated, with the result that, firstly, the feed of the effective signal is interrupted and a connection is provided between the end amplifier 6 and the outlet 10 of the calibrating impulse generator 11 and, secondly, that the dual counter 12 is brought to a zero position and the tact impulse actuator 20 is started. The outgoing voltage at the outlet 10 of the generator 11 is a zero up to the time $t_1$, so that the line writer 7 will inscribe the zero line 37, the length of which depends upon the switched on condensers 24 or 25. At the time $t_1$, when the locked condition of the dual counter 12 is eliminated, the first flip-flop step of the dual counter 12 is kipped by a tact impulse produced by the tact impulse actuator 20. A voltage $U_{13} > U_2$ is produced at the outlet 13 of the dual counter 12, which brings the transistor 15 into a conducting state and thus closes a circuit composed of the voltage $U_2$ as well as the resistances 17 and 19. The voltage jump taking place at the resistance 19 is inscribed by the line writer 7 as the step 38 of the calibrating marking 36.

At the time $t_2$ the first flip-flop step is kipped back into the initial position by a second tact impulse, so that the transistor 15 is again locked. However, at the same time the second flip-flop step is kipped, with the result that the voltage $U_{14} > U_2$ now produced at the outlet 14 of the dual counter 12, sets the transistor 16 into the conducting state and thereby closes a circuit consisting of the voltage $U_2$ and the resistances 18 and 19. The voltage jump taking place at the resistance 19 is inscribed by the line writer 7 as the step 39 of the calibrating marking 36. When the second flip-flop step of the dual counter 12 is kipped, a locking impulse is also created which switches off the tact impulse actuator 20.

At the time $t_3$ the relay 8 is brought automatically again into a non-excited condition, so that the connection between the generator 11 and the end amplifier 6 is interrupted and the end amplifier is again connected with the device 3.

This condition continues until the key 9 is again actuated.

The resistances 11, 18 and 19 are made of such size that the amplitude $U_E$ of the calibrating impulses 10' at the outlet 10 of the calibrating impulse producer 11 corresponds to the voltage at the outlet 5 of the device 3 when the measuring ranges are fully actuated.

The blending of the sinus oscillation 40 (indicating marking) produced by the sinus generator 28 takes place as follows for the individual measuring ranges:

1. 10 Torr or 100 Torr measuring range: The changeover switch 30 is located in the switch position 1. The sinus oscillation 40 is always blended at the zero line 27, since the two voltages $U_{13}$ and $U_{14}$ are both zero only during the time period $t_1 - t_o$.

2. 20 Torr or 200 Torr measuring range: The changeover switch 30 is located in the switch position 2. The sinus oscillation 40 is always blended at the step 38 of the calibrating marking 36, since only the voltage $U_{14}$ is zero during the time period $t_2 - t_1$, while the voltage $U_{13}$ has at that time a positive value $U_{13} > U_2$.

3. 40 Torr or 400 Torr measuring range: The changeover switch 30 is located in the switch position 3. The sinus oscillation 40 is always blended at the step 39 of the calibration marking 36, since only the voltage $U_{13}$ is zero during the time period $t_3 - t_2$, while the voltage $U_{14}$ has at that time a positive value $U_{14} > U_2$.

The present invention makes it possible to provide without great exertion a quick and definite evaluation of pressure curves obtained by the line inscriber. The use of only one indicating generator and of one calibrating impulse generator which is the same for all measuring ranges and which produces calibrating impulses of the same size makes it possible to construct measuring devices of comparatively small size and of a simple technical circuit structure.

I claim:

1. An electrical measuring device, such as a manometer for direct blood measurements, comprising means for receiving a desired measuring signal, a signal inscriber, signal amplification means connected between said signal receiving means and said signal inscriber and including a device for range selection, a calibrating impulse generator adapted for producing calibration unit impulses independent from the selected range of said range selection device, a range marking generator operatively connected with said device for range selection and adapted for producing range markings dependent from the individual selected ranges of said signal range selection device, a switch adapted for connecting said calibrating impulse generator and said marking generator with said signal inscriber, and actuating means at the one hand for actuating said switch to connect said calibrating impulse generator and said marking generator with said signal inscriber, and at the other hand for actuating said calibrating impulse generator to produce at least one calibration unit impulse independent from the selected range of said range selection device and said range marking generator to produce a range marking corresponding to the selected range of said range selection device and to supply calibration unit impulse together with said range marking to said signal inscriber.

2. An electrical measuring device in accordance with claim 1, wherein siad switch is a changeover switch adapted to connect said signal inscriber either with said signal amplification means or with said calibrating impulse generator and said marking generator.

3. An electrical measuring device in accordance with claim 2, wherein the amplitude of the calibrating impulses of said calibrating impulse generator corresponds to the output voltage of said signal amplification means at full utilization of ranges at the device for range selection.

4. An electrical measuring device in accordance with claim 3, wherein the calibrating impulses are stepped upon at least one flank.

5. An electrical measuring device in accordance with claim 4, wherein the steps are of the same size.

6. An electrical measuring device in accordance with claim 5, having a separate marking generator for each selected range.

7. An electrical measuring device in accordance with claim 5, wherein different ranges are combined into range groups of substantially equal strength and having a separate group indication generator for each range group and a plurality of range indication generators the number of which corresponds to the number of measuring ranges in each group, the markings of said range indication generators in combination with a group marking of a group indication generator producing the measuring range indication blended along with calibration unit markings of said calibrating impulse generator.

8. An electrical measuring device in accordance with claim 7, comprising means for time-delayed blending of calibrating markings of said calibrating impulse generator after interruption of effeciive signal from the inscriber.

9. An electrical measuring device in accordance with claim 8, comprising means changing the time delay, the different time delays being used for group indication or indication of measuring ranges within the groups.

10. An electrical measuring device in accordance with claim 9, comprising a single indicating generator for indicating measuring ranges within a group, said generator operating depending upon the selected measuring range of said device for range selection and being actuated by said calibrating impulse generator for supplying markings similar to all measuring ranges between the interruption of the effective signal and calibrating marking blending or between two steps of the calibrating impulse which follow each other.

11. An electrical measuring device in accordance with claim 10, comprising means switching on and off said indicating generator depending upon the outlet voltage of said calibrating impulse generator.

12. An electrical measuring device in accordance with claim 10, wherein said indicating generator is continuously switched on, and having a plurality of gate switches interconnected in parallel and located between said indicating generator and said signal inscriber, the indicating marking being supplied by said gate switches, said gate switches being opened individually depending upon the position of said device for range selection and being actuated by said calibrating impulse generator.

13. An electrical measuring device in accordance with claim 10, wherein said indicating generator is continuously switched on, and having a single electronic gate switch located between said indicating generator and said signal inscriber, the indicating marking being supplied by said gate switch, said gate switch being opened by a diode matrix-produced switch signal depending upon the position of said device for range selection and the outlet voltage of said calibrating impulse generator.

* * * * *